(12) United States Patent
Hoshino

(10) Patent No.: US 8,065,033 B2
(45) Date of Patent: Nov. 22, 2011

(54) LIBRARY APPARATUS AND POSITION CONTROLLING METHOD

(75) Inventor: Keisuke Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 12/007,796

(22) Filed: Jan. 15, 2008

(65) Prior Publication Data

US 2008/0201012 A1 Aug. 21, 2008

(30) Foreign Application Priority Data

Feb. 15, 2007 (JP) .................................. 2007-035460

(51) Int. Cl.
*G06F 17/00* (2006.01)

(52) U.S. Cl. ........ 700/218; 700/214; 414/273; 414/274; 369/24.01

(58) Field of Classification Search ............... 369/30.31, 369/30.39
See application file for complete search history.

(56) References Cited

U.S. PATENT DOCUMENTS

| | | | | |
|---|---|---|---|---|
| 5,303,034 | A * | 4/1994 | Carmichael et al. | 356/620 |
| 5,963,514 | A * | 10/1999 | Kanetsuku et al. | 369/30.34 |
| 6,005,734 | A | 12/1999 | Shimada et al. | |
| 6,330,489 | B1 * | 12/2001 | Iwakawa | 700/218 |
| 6,671,574 | B1 * | 12/2003 | Hashimoto | 700/215 |
| 7,047,106 | B2 * | 5/2006 | Butka et al. | 700/245 |
| 7,291,855 | B1 | 11/2007 | Mihara | |
| 7,311,326 | B2 * | 12/2007 | Matsuda et al. | 280/735 |
| 7,469,925 | B2 * | 12/2008 | Matsuda | 280/735 |
| 2005/0230470 | A1 * | 10/2005 | Hoshino | 235/375 |

FOREIGN PATENT DOCUMENTS

| | | |
|---|---|---|
| JP | 09-198755 | 7/1997 |
| JP | 2000-123448 | 4/2000 |
| JP | 2002-133751 | 5/2002 |
| JP | 2007-250114 | 9/2007 |

OTHER PUBLICATIONS

Chinese Office Action issued Jan. 22, 2010 in corresponding Chinese Patent Application 2007101597607.
Korean Office Action issued on Mar. 30, 2009 in corresponding Korean Patent Application 10-2007-137904.
Japanese Office Action for Application No. 2007-035460; mailed Jul. 19, 2011.

* cited by examiner

*Primary Examiner* — Gene Crawford
*Assistant Examiner* — Kyle Logan
(74) *Attorney, Agent, or Firm* — Staas & Halsey LLP

(57) ABSTRACT

A library apparatus includes a cell unit having a plurality of cells arrayed in a matrix, a holder to insert the storage medium to one of the cells or extract the storage medium from the cell, and a position controller to move the holder over the cell unit in X-axis and Y-axis directions to position the holder at a desired position. The holder has a reading unit configured to acquire data of the edges on both sides of each cell. The position controller determines each position of the cells on the basis of the data of the edges acquired at a plurality of positions while moving the holder in a predetermined direction from a predetermined position of the cell unit.

2 Claims, 11 Drawing Sheets

LIBRARY APPARATUS AND POSITION CONTROLLING METHOD

BACKGROUND OF THE INVENTION

1. Field

This apparatus relates to position correction when a magnetic tape is accommodated in a cell of a magnetic tape library apparatus.

2. Description of the Related Art

The capacity of hard disks is increasing markedly. If data is lost, the loss is not just a problem for an individual or a company it may affect a large number of people. Storing a backup of data is extremely important for the use of a computer in case of the loss of data. To store a backup of data, a magnetic tape library apparatus is frequently used. The apparatus uses a magnetic tape as a storage medium. A magnetic tape library apparatus accommodates several to several hundred magnetic tapes. The apparatus has at least one drive, and one or two robots. The apparatus also has a casing called a locker with cells attached for accommodating the magnetic tapes. The apparatus operates a robot to insert the magnetic tape to the cell, or extract the magnetic tape from the cell, carry the magnetic tape, and mount the magnetic tape on the drive for read or write operation. When the read or write operation is completed, the robot demounts the magnetic tape from the drive, carries the magnetic tape, and inserts the magnetic tape to the former cell.

FIGS. 1A and 1B are explanatory illustrations showing cells of a related art.

FIG. 1A shows an example of a normal position. Cells 5 are arrayed in a matrix. Relative flags 61 are arranged at three positions of the matrix. A locker may be deformed due to variation in assembly, transport, installation environment, and the like. As the locker is deformed, the cells may be deformed accordingly. FIG. 1B shows an example with deformation. The deformation usually appears in the form of a parallelogram because of the structure of the locker, and sometimes includes a rotation. Thus, the center positions (x1, y1), (x2, y2), (x3, y3) of the relative flags 61 in the normal positions are shifted to (x'1, y'1), (x'2, y'2), (x'3, y'3). To correct the deformation, relative flags 61 located on a deformed surface may be measured, and distances from default positions of the relative flags 61 to shifted positions thereof may be calculated. The distances of the relative flags 61 are measured with, for example, a charge-coupled device (CCD) sensor mounted on a robot. The position of the robot is corrected, so that the robot is controlled to reliably hold the magnetic tape. With the above-described controlling method, the relative flags 61 have to be provided for the correction of relative values, this may reduce the number of magnetic tapes in the magnetic tape library apparatus.

SUMMARY

Accordingly, an object of the present invention is to provide a library apparatus and a position controlling method of the library apparatus, the apparatus being capable of correcting a position error with a simple configuration without using a special mark such as a relative flag.

A library apparatus according to an aspect of the present invention includes a cell unit having a plurality of cells arrayed in a matrix and configured to accommodate at least a storage medium, a holder configured to insert the storage medium to one of the cells or extract the storage medium from the cell, and a position controller configured to move the holder over the cell unit in X-axis and Y-axis directions to position the holder at a desired position. Each of the cells has edges on both left and right sides of a medium insertion slot thereof, the edges having an optical characteristic different from that of other portions. The holder has a reading unit configured to read data of the edges on both sides. The position controller determines each position of the cells on the basis of the data of the edges acquired at a plurality of positions while moving the holder in a predetermined direction from a predetermined position of the cell unit.

Another aspect of the present invention relates to the position controlling method of the library apparatus.

The position controlling method includes positioning the reading unit at a predetermined position of the cell unit, acquiring the data of the edges by reading the edges at a plurality of positions while the reading unit is moved downward in the Y-axis direction from the predetermined position, calculating a tilt angle of the cell on the basis of the data of the edges acquired with the reading unit, and determining each position of the cells on the basis of the calculated tilt angle and the acquired data of the edges.

With this configuration, the position correction can be performed by reading the edges located on both sides of each cell and having the optical characteristic different from that of the other portions. Accordingly, the position correction can be performed with a simple configuration using the existing casing structure.

DESCRIPTION OF THE PREFERRED EMBODIMENTS

First Embodiment

Figure 1A:
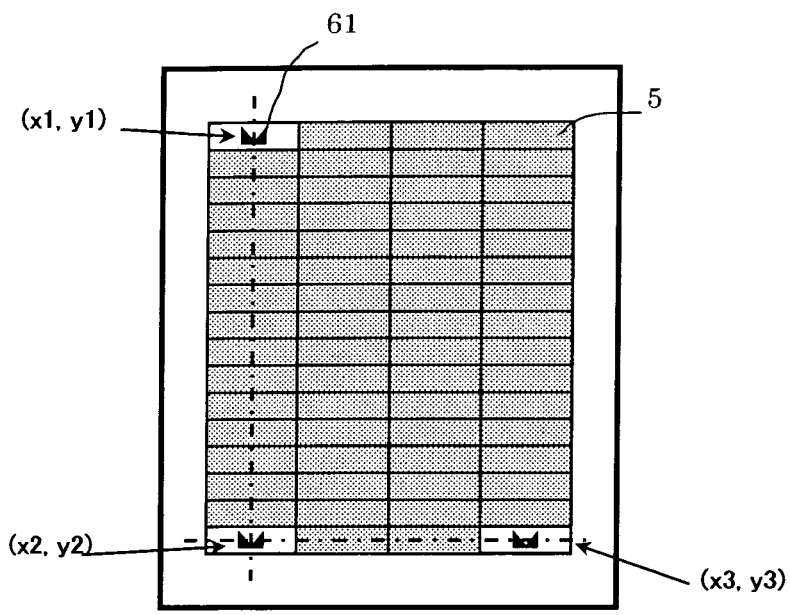
FIGS. 1A and 1B are explanatory illustrations each showing cells of the related art.
Figure 1B:
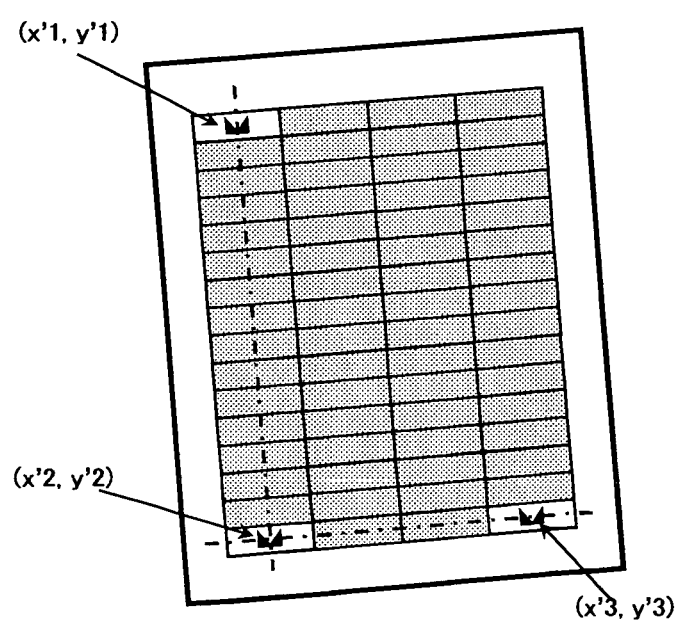
Figure 2:
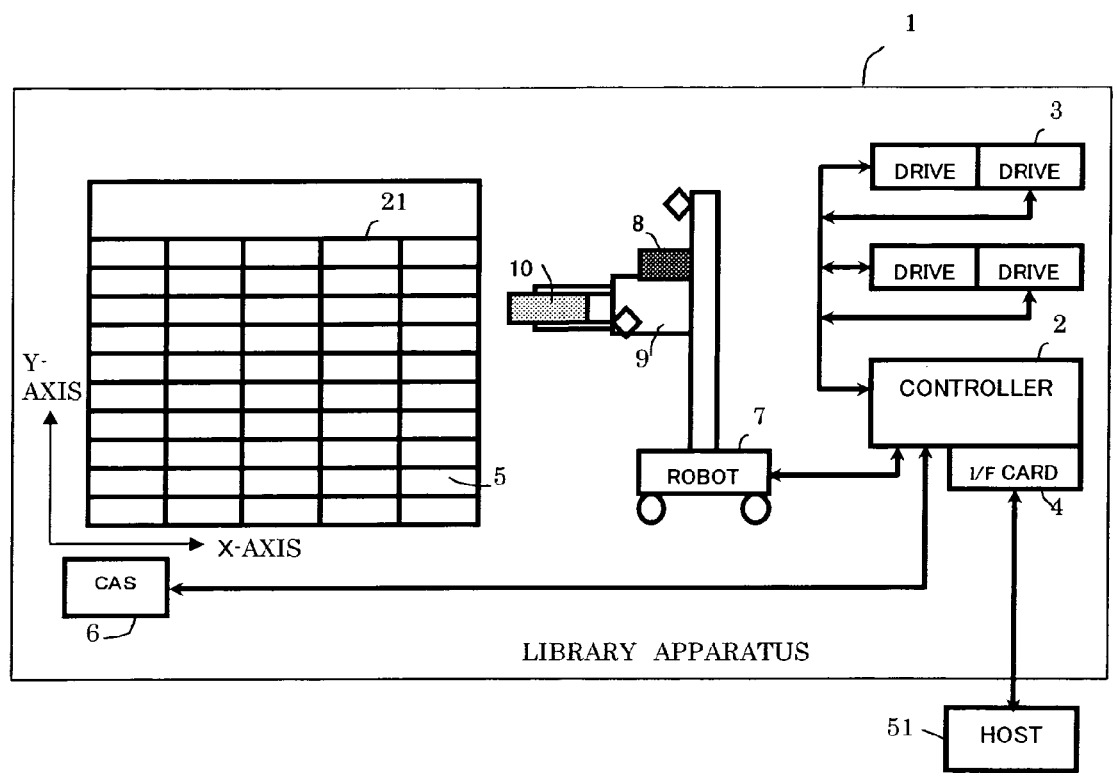
FIG. 2 is an illustration schematically showing a configuration of a library apparatus.

FIG. 2 is an illustration schematically showing a configuration of a library apparatus.

A library apparatus 1 includes a controller 2, at least one drive 3, an interface card 4 (hereinafter, referred to as I/F card 4), cells 5, at least a cartridge access station 6 (hereinafter, referred to as CAS 6), a robot 7, a CCD sensor 8, a hand 9, and a magnetic tape 10.

The controller 2 controls the entire library apparatus 1.

The drive 3 is a tape drive device that writes or reads data on or from the magnetic tape 10.

The I/F card 4 is a board that controls communication with a host 51.

The cells 5 define a rack for accommodating the magnetic tape 10. The cells 5 are arrayed in a matrix, and form a cell unit 21. The cell unit 21 has cell columns extending in a Y-axis direction and cell rows extending in an X-axis direction. Each of the cells 5 has edges on both left and right sides of an insertion slot for the magnetic tape 10a.

The CAS 6 facilitates insertion and extraction of the magnetic tape 10 to or from the library apparatus 1.

The robot 7 provides means for carrying the magnetic tape 10 between the drive 3 and a desired cell 5. The robot 7 moves in the X-axis direction, the Y-axis direction, and a Z-axis direction in the library apparatus 1. The robot 7 has a hand 9 that holds the magnetic tape 10, and a CCD sensor 8 that detects an ID number, edges, and the like, of the magnetic tape 10. To write or read data on or from the magnetic tape 10, the robot 7 moves to a cell 5 accommodating the magnetic tape 10, ID number of which is selected by the host 51. Then, the robot 7 extracts the magnetic tape 10, carries the magnetic tape 10 to the drive 3, and mounts the magnetic tape 10 on the drive 3. After data is written or read, the magnetic tape 10 is demounted from the drive 3, carried to the cell 5 at the former X and Y coordinates, and inserted to the cell 5.

The CCD sensor 8 is mounted on the hand 9. The CCD sensor 8 scans a bar code label attached to the magnetic tape 10 to read the bar code, and transmits the read data to the controller 2. The information of the bar code includes the ID number of the magnetic tape 10, and the like. The CCD sensor 8 reads data of the edges on both sides of the cell 5.

The hand 9 is a device that inserts or extracts the magnetic tape 10 to or from the cell 5.

The magnetic tape 10 is configured such that a tape medium wound around a reel is accommodated in a cartridge. The bar code label indicating the ID number and the like is attached on the back side of the magnetic tape 10.

Figure 3:
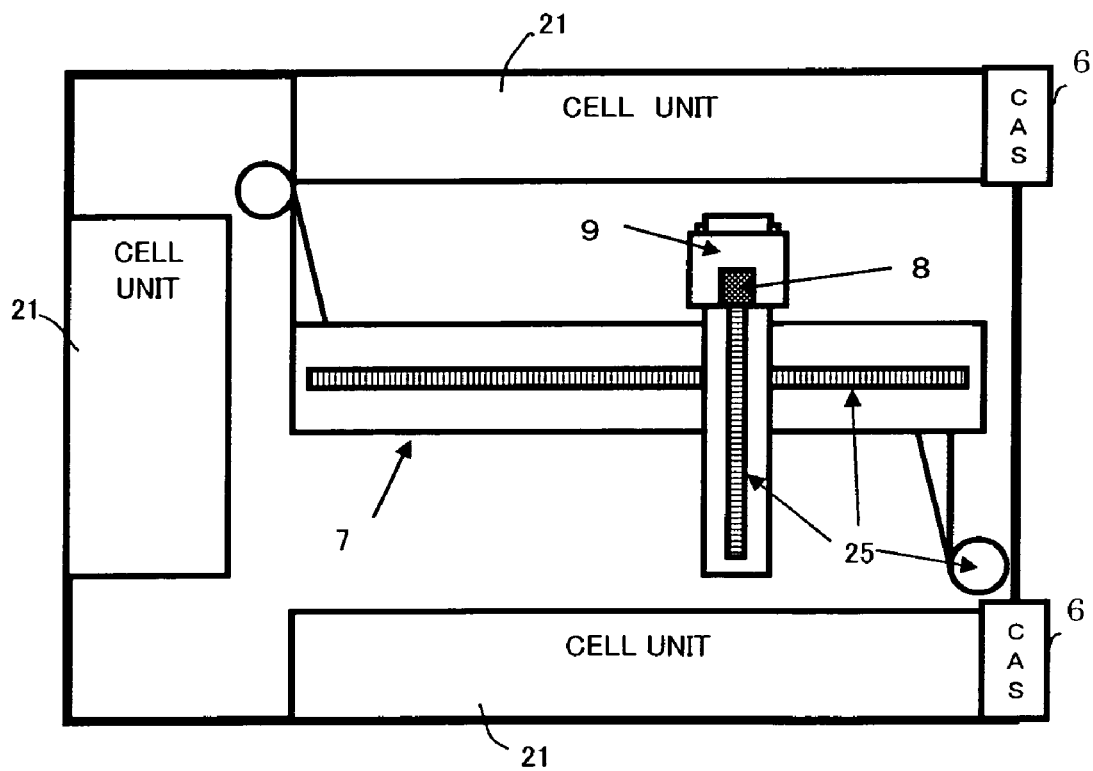
FIG. 3 is an illustration schematically showing the library apparatus.

FIG. 3 is a schematic illustration showing the library apparatus.

The robot 7 moves the hand 9, on which the CCD sensor 8 is mounted, in a space surrounded by three cell units 21 in the X-axis, Y-axis and Z-axis directions along rails 25, for insertion/extraction of the magnetic tape 10.

Figure 4:
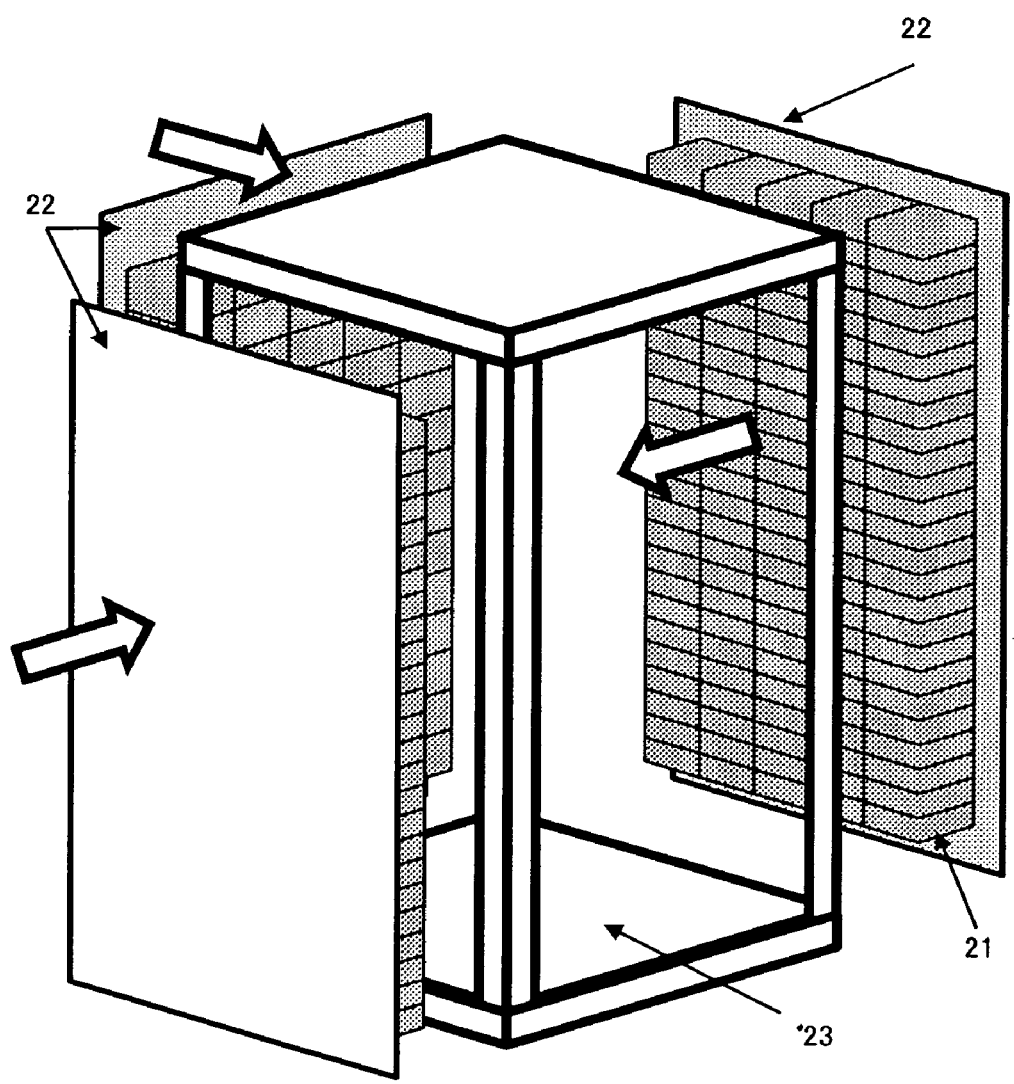
FIG. 4 is an illustration showing a configuration of a locker of the library apparatus.

FIG. 4 is an illustration showing a configuration of a locker of the library apparatus.

A locker 23 is provided with three cell fixing plates 22. The cell units 21 are fixed to the cell fixing plates 22, respectively. The cell fixing plates 22 are attached to the locker 23 in directions indicated by arrows.

Figure 5:
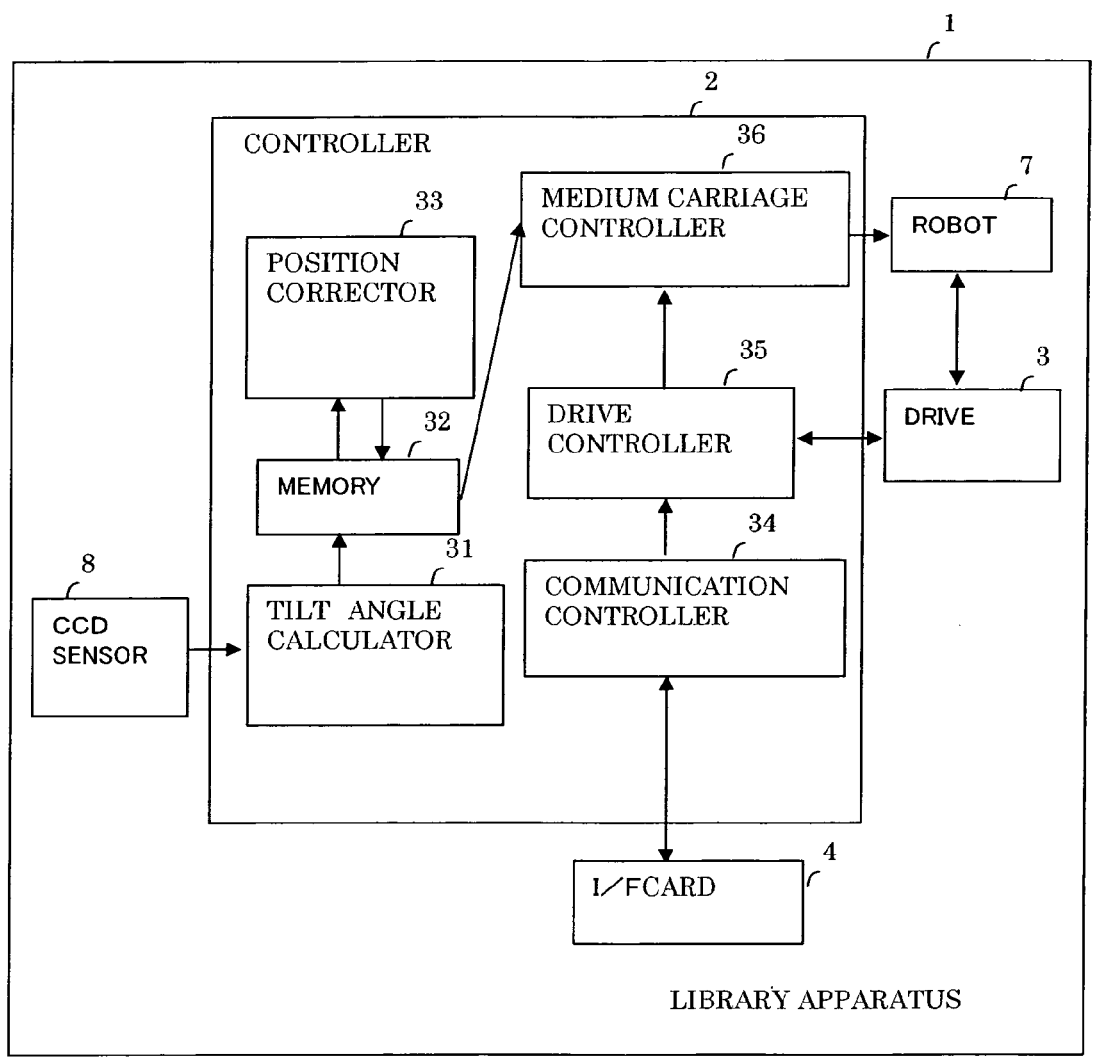
FIG. 5 is a block diagram showing a controller.

FIG. 5 is a block diagram showing a controller.

The controller 2 includes a tilt angle calculator 31, a memory 32, a position corrector 33, a communication controller 34, a drive controller 35, and a medium carriage controller 36.

The tilt angle calculator 31 calculates a tilt angle of a cell 5 with respect to the Y-axis direction (vertical direction) and that with respect to the X-axis direction (horizontal direction).

The memory 32 stores coordinate (X, Y) data of each edge acquired with the CCD sensor 8, nominal coordinate (X, Y) data of the center of each cell 5, corrected coordinate (X, Y) data of the center of each cell 5, and tilt angle data. The memory 32 also stores an ID number of each magnetic tape 10 and coordinates of a corresponding cell 5.

The position corrector 33 calculates a corrected center position of each cell 5 on the basis of the tilt angle obtained with the tilt angle calculator 31 and the coordinate (X, Y) data of each edge. The calculated value is stored in the memory 32.

The communication controller 34 controls the I/F card 4 to communicate with the host 51.

The drive controller 35 allows the magnetic tape 10 to be mounted on the drive 3 when the magnetic tape 10 selected by the host 51 is carried to the drive 3 selected by the host 51. The drive controller 35 also allows the magnetic tape 10 to be demounted when the magnetic tape 10 is carried to the cell 5 selected with the host 51. Further, the drive controller 35 acquires the condition of the drive 3 so as to provide the condition of the drive 3 to an operator.

The medium carriage controller 36 drives the robot 7 to be moved to the cell 5 that accommodates the magnetic tape 10 with the ID number selected by the host 51. Then, the robot 7 reads the ID number with the CCD sensor 8. If the magnetic tape 10 is the desired one, the robot 7 extracts the magnetic tape 10 from the cell 5, carries it to the drive 3. After data is written or read, the robot 7 extracts the magnetic tape 10 from the drive 3, carries it to the former cell 5, and inserts it to the cell 5.

Next, the operation of the control for position correction of the library apparatus 1 is briefly described.

Both left and right edges of the cells 5 of the library apparatus 1 are painted white. Instead of painting, a white tape may be attached on both sides of the cells 5. In contrast, the cell fixing plate 22 and the cells 5 are black so as to increase the difference between the optical characteristic of the edges 24 and that of other portions for the CCD sensor 8.

In the method for correcting relative values, a predetermined position of the hand 9 stored in the memory 32 is acquired, and the hand 9 of the robot 7 is positioned accordingly. Note that the predetermined position is located at an upper portion of the cell unit 21. Then, the CCD sensor 8 mounted on the hand 9 sequentially reads the cells 5 while the hand 9 is moved from the upper side to the lower side of the cell unit 21, to detect the presence of the white edges 24 located on both sides of the cells 5. Assuming that the locker 23 is deformed in the form of a parallelogram, a tilt angle of the oblique sides of the parallelogram and the positions of the cells 5 can be determined.

Also, the bottom side of the parallelogram possibly tilts depending on the position accuracy of the surface of the cell fixing plate 22 when the cell fixing plate 22 is screwed to the locker 23. In such a case, the parallelogram may be rotated clockwise or counterclockwise around the vertex of the bottom side of the parallelogram. As a result, a tilt with respect to the vertical direction and a tilt with respect to the horizontal direction may appear. The tilt angles and the positions of the cells 5 can be obtained also in this case by reading white edges on both sides of the cells 5. Since the corrected positions can be obtained in this way, the magnetic tapes 10 can be accurately inserted or extracted. Accordingly, the portions where the relative flags were provided can be used as cells 5, thereby increasing the number of the magnetic tapes 10.

Figure 6:
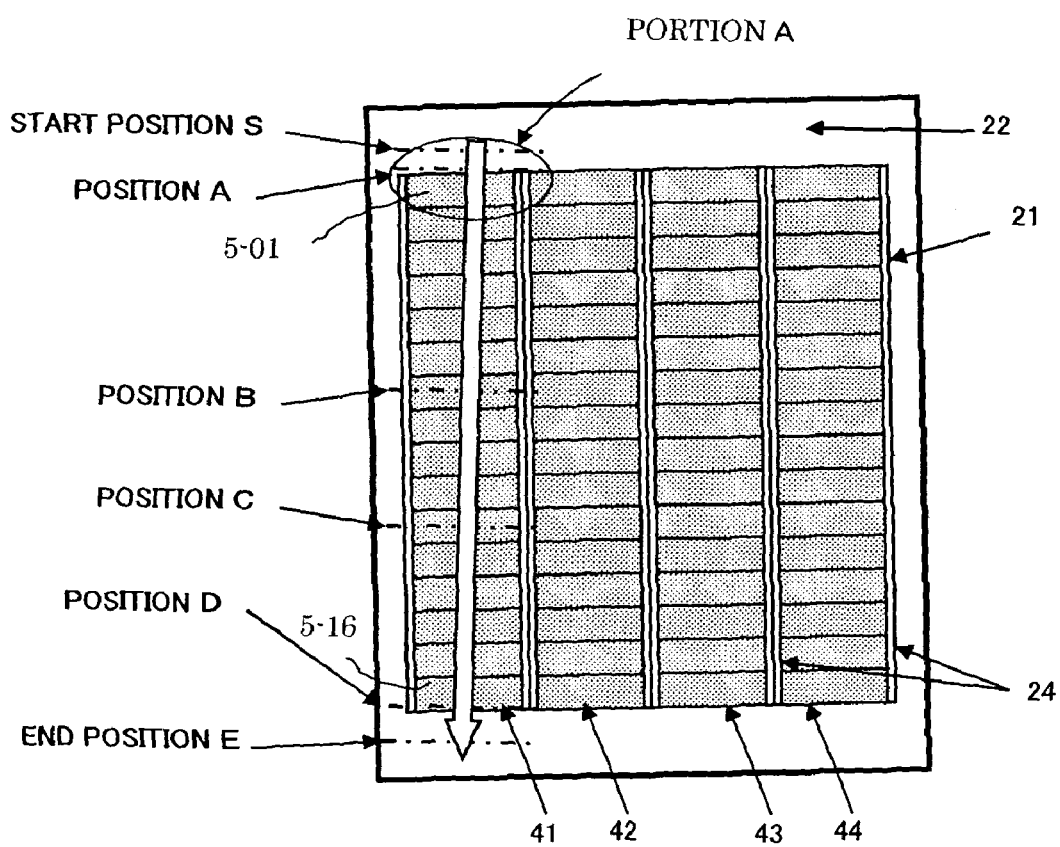
FIG. 6 is an explanatory view showing position correction.

Next, the position correction is described. FIG. 6 is an explanatory illustration showing the position control.

Described here is a case where the cells 5 tilt due to the attachment error of the cell fixing plate 22. In this embodiment, reading is started at a start position S, the edges are read at positions A, B, C and D, and reading is completed at an end position E. The details of a portion A will be described later.

Figure 7:
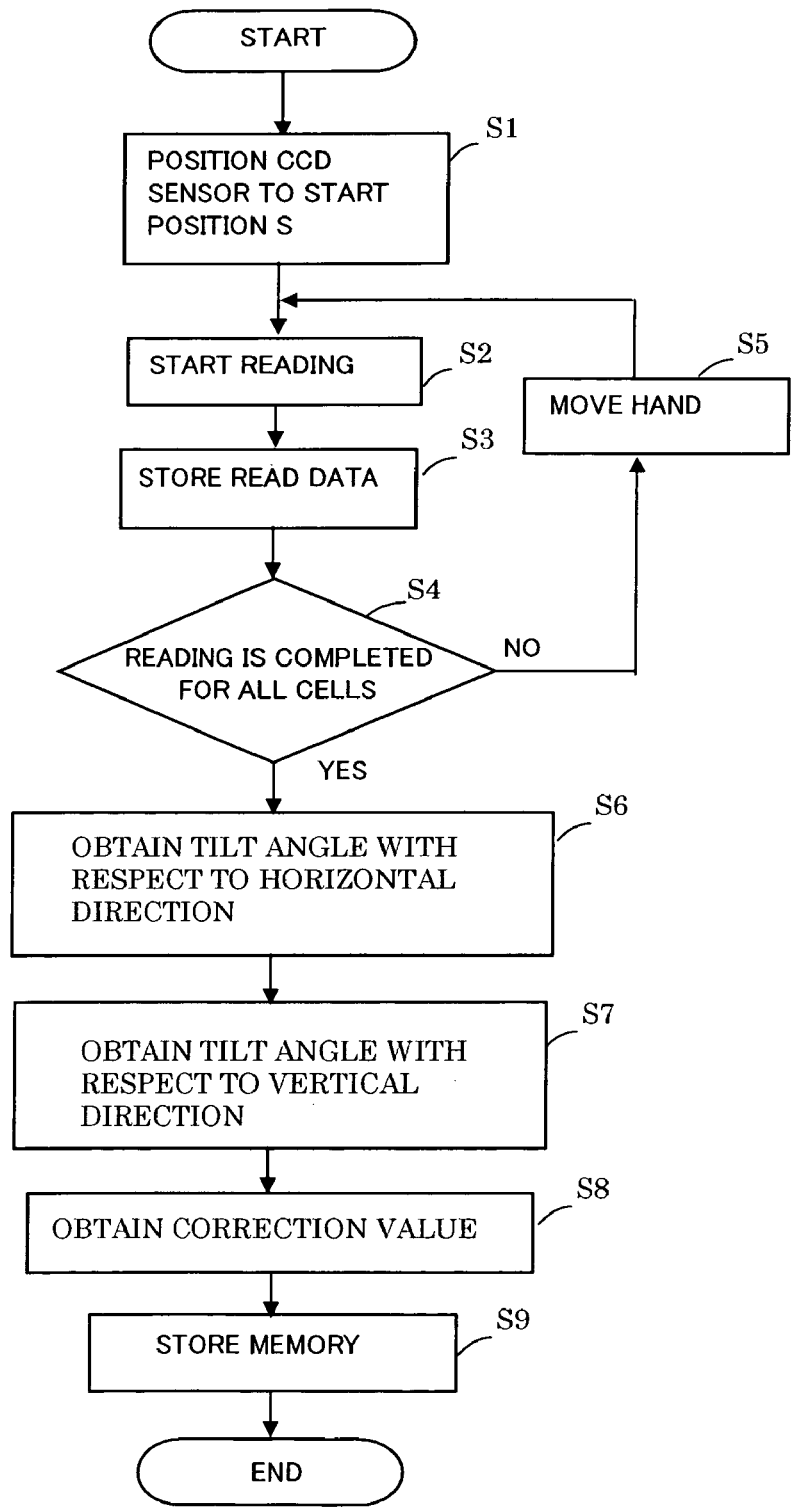
FIG. 7 is a flowchart showing a procedure of the position correction.

FIG. 7 is a flowchart showing a procedure of position correction.

The CCD sensor 8 on the hand 9 is positioned at the start position S located above the cells 5 of the locker 23 (step S1). For example, the start position S may have a value that a predetermined value is added to a nominal value in the Y-axis direction of a cell 5-01 shown in FIG. 6. It is assumed that the nominal value corresponds to the X and Y coordinates at the center position of the cell 5-01 when the locker 23 is not deformed.

Then, reading is started (step S2).

Then, read data is stored in the memory 32 (step S3).

It is determined whether or not reading is completed for all cells 5 (step S4).

If it is determined that not all cells 5 are read, then the hand 9 is moved in a predetermined direction (step S5). The hand 9 is moved downward when the cells 5 to be read are in the same column. If the end position for reading is detected, the hand 9 is moved to a position above the next column. After the movement is completed, the procedure goes to step S2.

If it is determined that all cells 5 are read, then a tilt angle with respect to the horizontal direction is obtained (step S6).

Then, a tilt angle with respect to the vertical direction is obtained (step S7).

Then, a correction value is obtained (step S8).

Then, the correction value is stored in the memory 32 (step S9).

Next, the ways of obtaining the tilt angle and correction value are described in detail.

Figure 8:
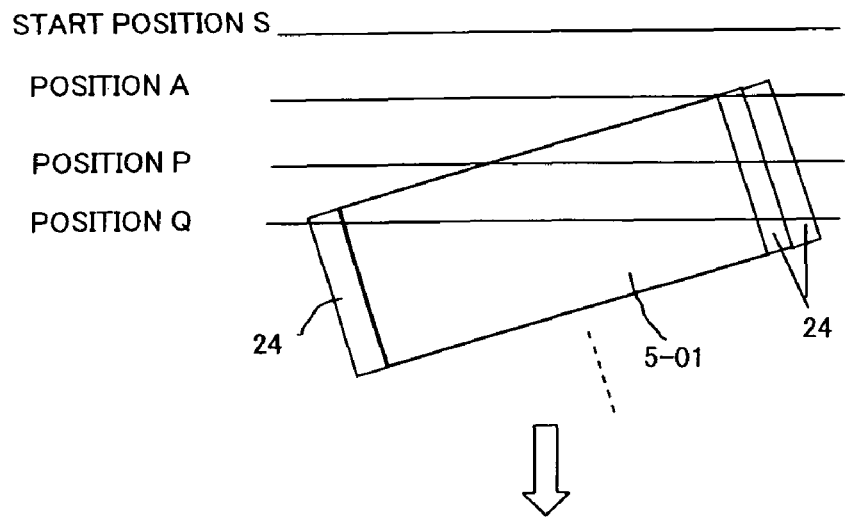
FIG. 8 is an explanatory illustration showing a portion A of FIG. 6.
Figure 8:
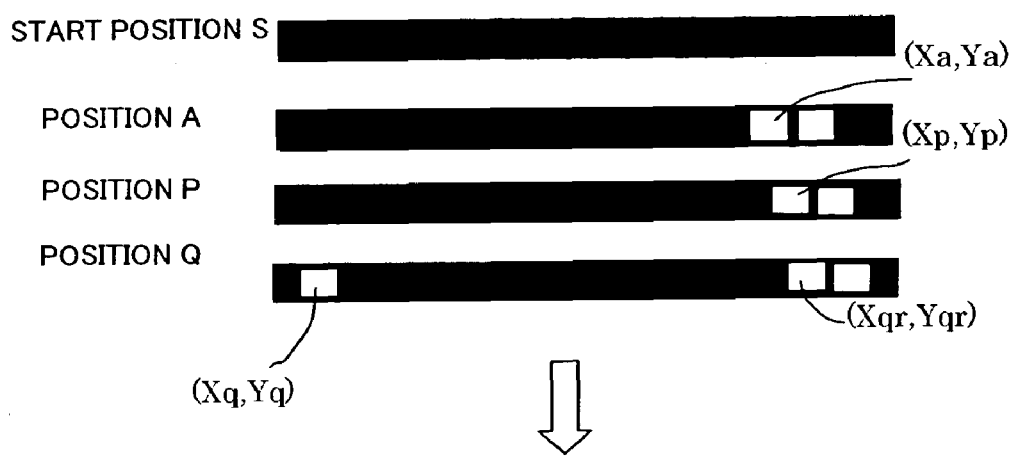
Figure 8:
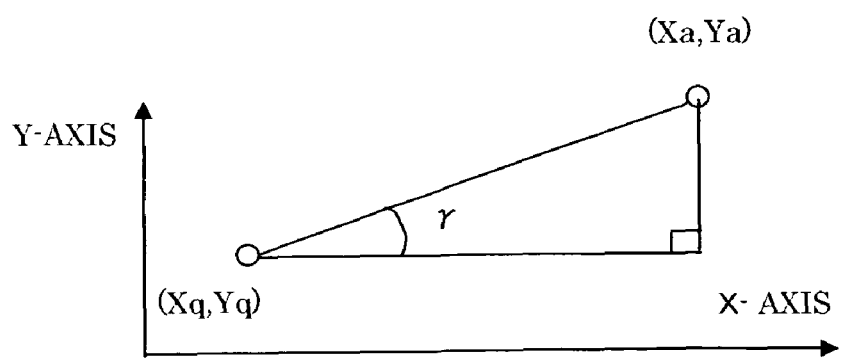

FIG. 8 is an explanatory illustration showing a portion A.

The portion A is located as illustrated in FIG. 6. A tilt angle of the cell column with respect to the horizontal direction is obtained.

Since the start position S is located above the cell 5-01 as shown in FIG. 8, no edge 24 can be detected. The read result shows only a black part.

Then, the robot 7 is moved downward. To detect the upper edge of the cell 5-01, the movement pitch of the robot 7 is set to a small value.

When reading is performed at the position A, the left edge 24 of the cell 5-01 is not detected, but the right edge 24 of the cell 5-01 is detected. That is, the uppermost right edge of the cell column 41 is detected at the position A. X and Y coordinates (Xa, Ya) of the uppermost right edge is stored in the memory 32.

Then, when reading is performed at the position P, the left edge 24 of the cell 5-01 is not detected, but the right edge 24 of the cell 5-01 is detected. X and Y coordinates (Xp, Yp) of the right edge is stored in the memory 32.

Then, when reading is performed at the position Q, the left edge 24 of the cell 5-01 is detected, and the right edge 24 of the cell 5-01 is detected. X and Y coordinates (Xq, Yq) of the left edge, and X and Y coordinates (Xqr, Yqr) of the right edge, at the position Q is stored in the memory 32. Reading is similarly continued downward.

Using the coordinates (Xq, Yq) of the left edge of the cell 5-01 at the position Q and the coordinates (Xa, Ya) of the right edge at the position A, a tilt angle γ with respect to the horizontal direction is obtained as follows:

$$\tan \gamma = (Ya - Yq)/(Xa - Xq)$$

Figure 9:
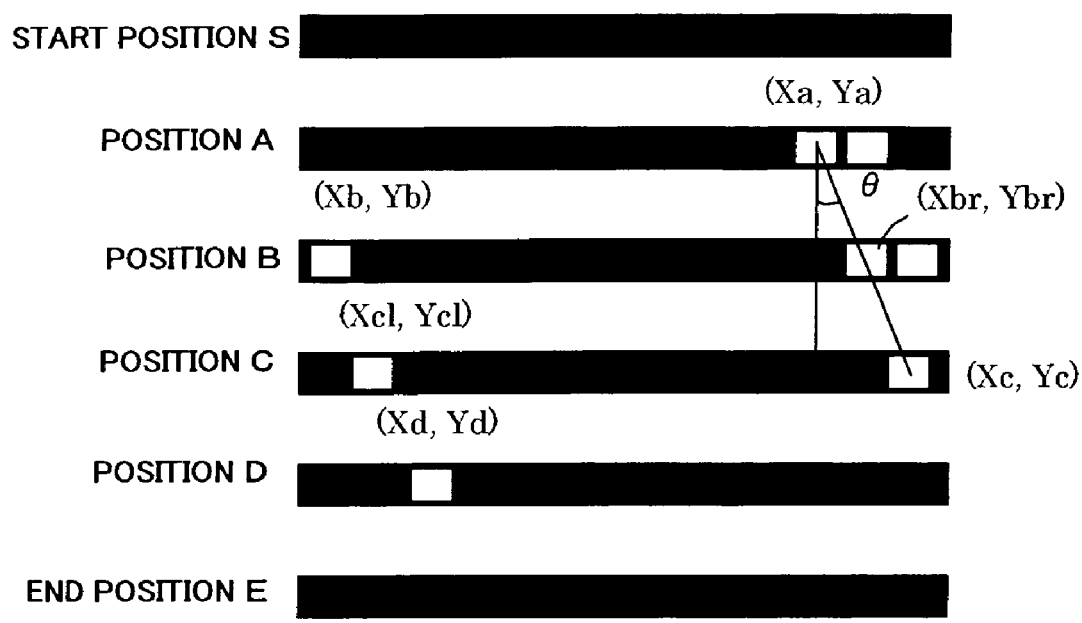
FIG. 9 is an explanatory illustration showing a tilt angle with respect to a vertical direction.

FIG. 9 is an explanatory illustration showing a tilt angle with respect to the vertical direction.

Since the tilt angle with respect to the vertical direction is described, the positions P and Q are eliminated. A portion below the position Q is being read with a predetermined pitch greater than the reading pitch for the tilt angle with respect to the horizontal direction, until the reading reaches cell 5-16 (see FIG. 6) located at the lowermost position in the cell column.

The X and Y coordinates of the edge 24 are acquired at the positions B and C, and stored in the memory 32. Then, when reading reaches the cell 5-15 (see FIG. 6), the downward movement pitch is set to a small value so as to detect the lowermost edge of the cell 5.

When reading is performed at the position D, the left edge 24 is detected, but the right edge 24 is not detected. In this embodiment, thus, the lower left edge of the cell 5-16 is detected.

Further moving the hand 9, the hand 9 is located outside the cell 5-16, and the CCD sensor 8 of the hand 9 is positioned at the end position E located below the cell 5-16. At this time, the edges 24 on both sides of the cell 5 are no longer detected. This position is the reading end position.

In the data parts acquired with the CCD sensor 8, the white sign seems to be shifted in the horizontal direction during the vertical movement of the robot 7 through the positions A, B, and C, or through the positions B, C, and D, where the edges 24 of the cell 5 can be read. As a result, a tilt angle θ with respect to the vertical direction can be obtained as follows:

$$\tan \theta = (Xa - Xc)/(Ya - Yc)$$

or, $$\tan \theta = (Xb - Xd)/(Yb - Yd)$$

Alternatively, a mean value of the results may be used. Still alternatively, an approximate line may be obtained through a least square method, thereby further increasing the accuracy of the tilt angle θ.

Next, a correction value is obtained.

Figure 10:
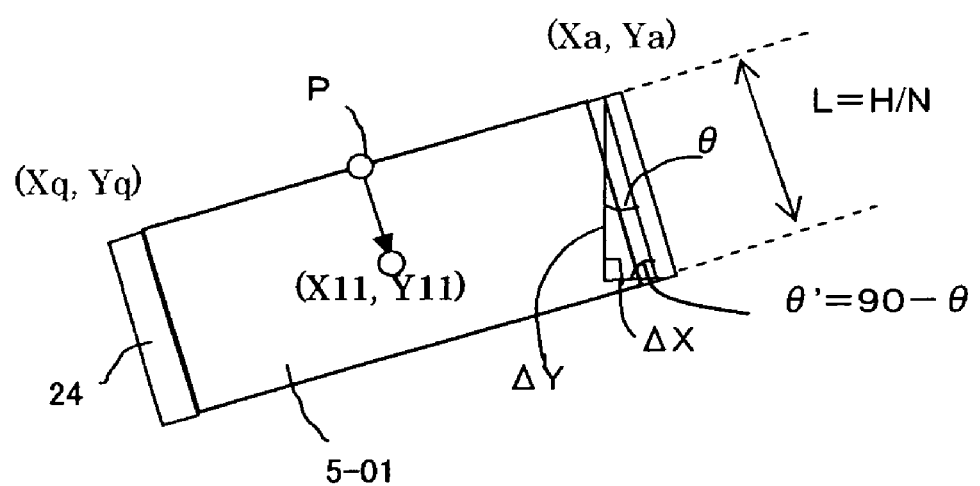
FIG. 10 is an explanatory illustration showing a correction amount.

FIG. 10 is an explanatory illustration showing a correction amount.

A central value is calculated using the position information of the cell 5 obtained through the measurement. In this embodiment, the hand 9 is positioned at the center position of the cell 5 so as to insert or extract the magnetic tape 10.

To calculate the central value, center position coordinates (X11, Y11) of the cell 5-01 are obtained.

First, coordinates of a point P are obtained.

In particular, the coordinates of the point P are obtained as follows:

$$\{(Xa+Xq)/2, (Ya+Yq)/2\}$$

To obtain the center position coordinates (X11, Y11) using the position P, a length of the edge 24 is obtained.

Since the length of the oblique side of the cell column 41 shown in FIG. 6 is equivalent to a nominal height H of the cell column 41, the length H is acquired from the memory 32. Thus, the length of the edge 24 of the cell 5-01 is obtained by dividing the height H by the number N of cells 5 (N=16), that is, the length is H/16.

Then, the position difference between the point P and the center position coordinates (X11, Y11) of the cell 5-01 is obtained as follows:

$$\Delta Y/2 = (H/16) \times 1/(2 \times \cos \theta), \Delta X/2 = (H/16) \times 1/(2 \times \cos \theta')$$

Accordingly, the central position coordinates (X11, Y11) of the cell 5-01 can be obtained as follows:

$$(X11, Y11) = \{(Xa+Xq+\Delta X)/2, (Ya+Yq+\Delta Y)/2\}$$

The tilt angle is γ.

Center positions of the cells 5-02 to 5-16 can be obtained by sequentially adding ΔX and ΔY. Other cell columns 42 to 44 are similarly processed.

A position information table is newly created on the basis of the calculated position information of the center positions of the cells 5, and the table and the tilt angles are stored in the memory 32.

When the magnetic tape 10 is inserted to or extracted from the cell 5, the controller 2 can position the hand 9 at the center position of the cell 5 on the basis of the newly created position information acquired from the memory 32. After positioning, the hand 9 is rotated by the tilt angle γ, and the magnetic tape 10 is inserted or extracted.

As described above, since data of edges for the cells 5 of the entire cell unit 21 does not have to be obtained, the processing time for the position correction can be reduced.

As another exemplary method for obtaining the tilt angle with respect to the horizontal direction, a method may be employed that obtains tilts of the cell columns 41 to 44 of the cell unit 21.

Figure 11:
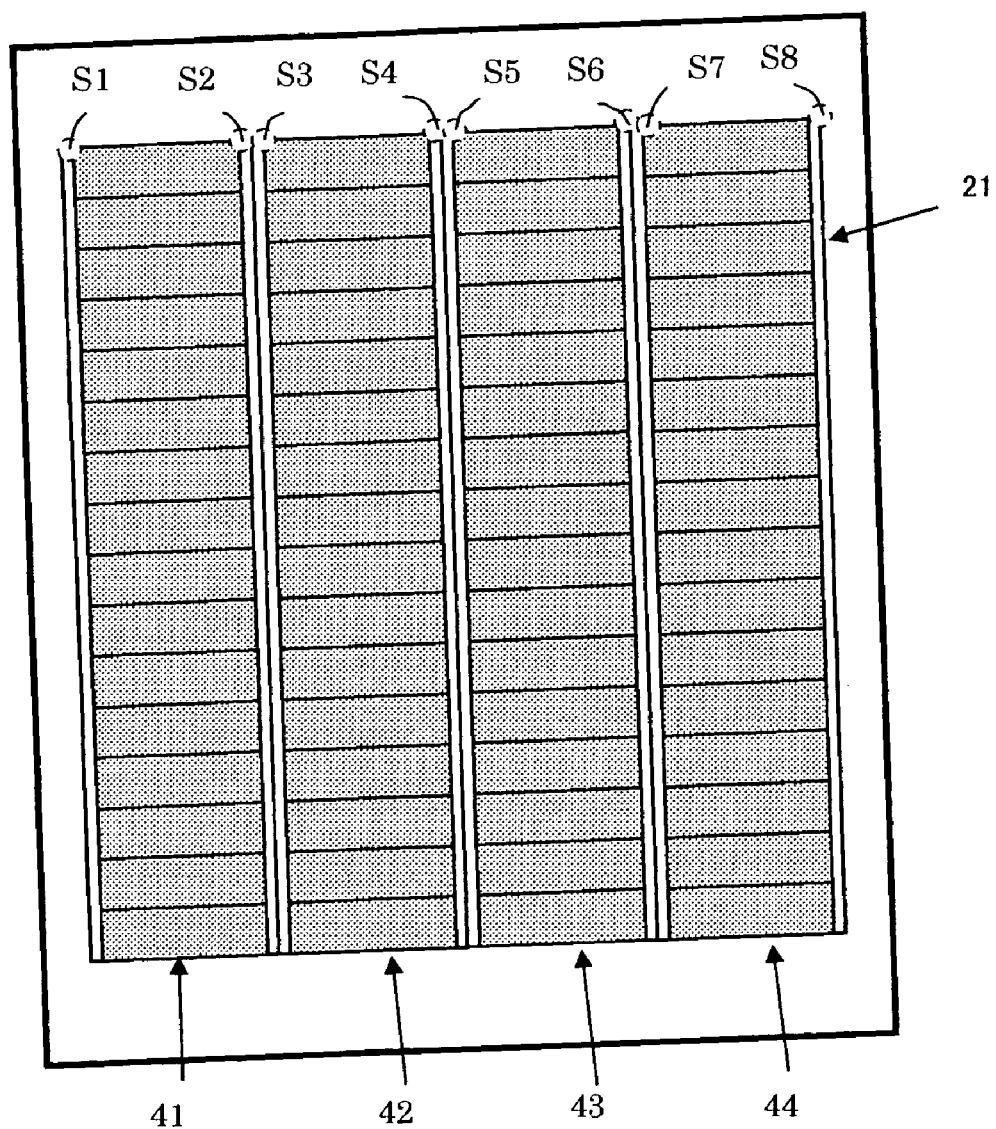
FIG. 11 is an explanatory illustration showing a tilt angle with respect to a horizontal direction.

FIG. 11 is an explanatory illustration showing a tilt angle with respect to the horizontal direction.

Coordinates of upper edges of the cell columns 41 to 44 are obtained.

In particular, S2=(Xa, Ya) and S1=(Xq, Yq) of the cell column 41, S4=(Xa2, Ya2) and S3=(Xq2, Yq2) of the cell column 42, S6=(Xa3, Ya3) and S5=(Xq3, Yq3) of the cell column 43, and S8=(Xa4, Ya4) and S7=(Xq4, Yq4) of the cell column 44, are obtained. Tilt angles are obtained at every adjacent cells 5, and a mean value of the tilt angles is obtained. Alternatively, an approximate line may be obtained through a least square method, thereby obtaining a tilt angle using the line. Or, the tilt angle of the cells 5 with respect to the horizontal direction can be obtained using coordinates of the lower edges of the cell columns 41 to 44.

As a result, the relative values of the cells 5 and the robot 7 can be corrected without using a relative flag. The magnetic tapes 10 can be accommodated in the portions where the relative flags were arranged. Accordingly, the number of the magnetic tapes 10 in the magnetic tape library apparatus can be increased while the size of the locker is left unchanged, thereby efficiently using a space of the apparatus, and increasing a storage capacity thereof.

What is claimed is:

1. A library apparatus, comprising:
a cell unit including a plurality of cells arrayed in a matrix and configured to accommodate a storage medium, each of the cells having left and right edges, the left and right edges both having an optical characteristic different from other portions of the cells;
a cell fixing plate configured to fix the cell unit thereon, the cell fixing plate having an optical characteristic different from the left and right edges,
a holder configured to insert the storage medium into one of the cells or extract the storage medium from one of the cells, said holder including a reading unit configured to acquire data of the left and right edges, including first data of either of the left and right edges of one of the cells located at one end of a column of the cells extending in a Y-axis direction, and second data of both the left edge and the right edge of the cells in the column, other than the cell located at the one end, acquired while the holder moves in the Y-axis direction at a predetermined moving pitch, and
a position controller configured to move the holder over the cell unit in X-axis and Y-axis directions to position the holder at a desired position, said position controller determining a position of each of the cells based on the data of the left and right edges of the cells acquired by the reading unit while moving the holder in the Y-axis direction, said position controller including
a tilt angle calculator configured to calculate a tilt angle of the cell with respect to a horizontal direction based on the first data and the second data of the column, and
a position corrector configured to determine a position of the cells based on the calculated tilt angle and the data of the left and right edges acquired by the reading unit.

2. A position controlling method of a library apparatus, the apparatus including a cell unit having a plurality of cells arrayed in a matrix and configured to accommodate at least a storage medium, each of the cells having left and right edges having an optical characteristic different from other portions of each of the cells, a cell fixing plate configured to fix the cell unit thereon, the cell fixing plate having an optical characteristic different from both the left and right edges, a holder configured to insert the storage medium into one of the cells or extract the storage medium from one of the cells, the holder having a reading unit configured to acquire data of the left and right edges, and a position controller configured to move the holder over the cell unit in X-axis and Y-axis directions to position the holder at a desired position, the method comprising:
positioning the reading unit at a predetermined position of the cell fixing plate above the cell unit;
acquiring first data of either of the left or right edges of one of the cells located at an uppermost position of a cell column of the cells, while the holder moves downward in a Y-axis direction at a predetermined moving pitch;
acquiring second data of both the left edge and the right edge after the first data is acquired while the holder moves downwards in the Y-axis direction at the predetermined moving pitch,
acquiring third data of both the left edge and the right edge after the second data is acquired while the holder moves downwards in the Y-axis direction at the predetermined moving pitch;
calculating a tilt angle of the cells with respect to a horizontal direction based on the first and second data of the left and right edges acquired with the reading unit;
calculating a tilt angle of the cells with respect to a vertical direction based on the second and third data of the left and right edges acquired with the reading unit; and
determining each position of the cells based on the calculated tilt angle and the data of the left and right edges.

* * * * *